United States Patent
Woźniak et al.

(10) Patent No.: US 12,444,121 B2
(45) Date of Patent: Oct. 14, 2025

(54) PRE-FILTERING WITH ANISOTROPIC FILTER IN DECOUPLED SHADING

(71) Applicants: Advanced Micro Devices, Inc., Santa Clara, CA (US); ATI Technologies ULC, Markham (CA)

(72) Inventors: Michal Adam Woźniak, Santa Clara, CA (US); Guennadi Riguer, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 132 days.

(21) Appl. No.: 18/345,406

(22) Filed: Jun. 30, 2023

(65) Prior Publication Data
US 2025/0005838 A1 Jan. 2, 2025

(51) Int. Cl.
*G06T 15/00* (2011.01)
*G06T 15/04* (2011.01)

(52) U.S. Cl.
CPC .......... *G06T 15/005* (2013.01); *G06T 15/04* (2013.01); *G06T 2210/52* (2013.01)

(58) Field of Classification Search
CPC .... G06T 15/005; G06T 15/04; G06T 2210/52
See application file for complete search history.

(56) References Cited

U.S. PATENT DOCUMENTS

| | | | |
|---|---|---|---|
| 10,242,493 B2 * | 3/2019 | Liktor | G06T 15/04 |
| 2013/0051665 A1 * | 2/2013 | Shinozaki | G06T 5/00 382/167 |
| 2015/0287230 A1 * | 10/2015 | Cerny | G06T 17/10 345/501 |
| 2021/0350608 A1 * | 11/2021 | Akenine-Moller | G06T 15/005 |
| 2022/0215612 A1 * | 7/2022 | Fielding | G06T 7/44 |
| 2024/0312110 A1 * | 9/2024 | Zorn | G06T 1/20 |

* cited by examiner

*Primary Examiner* — Devona E Faulk
*Assistant Examiner* — Donna J. Ricks
(74) *Attorney, Agent, or Firm* — Volpe Koenig

(57) ABSTRACT

A technique for rendering is provided. The technique includes generating a first gradient for a shade space texture tile, wherein the first gradient reflects a relationship between shade space texel spacing and screen space pixel spacing; generating a second gradient for a shade space texel of the shade space texture tile, wherein the second gradient reflects a relationship between material texel spacing and shade space texel spacing; combining the first gradient and the second gradient to obtain a third gradient; and performing anisotropic filtering on the material texture using the third gradient to obtain a value for the shade space texel.

20 Claims, 8 Drawing Sheets

PRE-FILTERING WITH ANISOTROPIC FILTER IN DECOUPLED SHADING

CROSS-REFERENCE TO RELATED APPLICATIONS

This application is related to U.S. patent application Ser. No. 18/345,378, entitled "ANISOTROPIC SHADE SPACE SAMPLE DENSITY FOR DECOUPLED SHADING,", which is filed herewith. The contents of this related application are hereby incorporated by reference herein as if fully set forth herein.

BACKGROUND

Three-dimensional graphics processing involves rendering three-dimensional scenes by converting models specified in a three-dimensional coordinate system to pixel colors for an output image. Improvements to three-dimensional graphics processing are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for rendering is provided. The technique includes generating a first gradient for a shade space texture tile, wherein the first gradient reflects a relationship between shade space texel spacing and screen space pixel spacing; generating a second gradient for a shade space texel of the shade space texture tile, wherein the second gradient reflects a relationship between material texel spacing and shade space texel spacing; combining the first gradient and the second gradient to obtain a third gradient; and performing anisotropic filtering on the material texture using the third gradient to obtain a value for the shade space texel.

Figure 1:
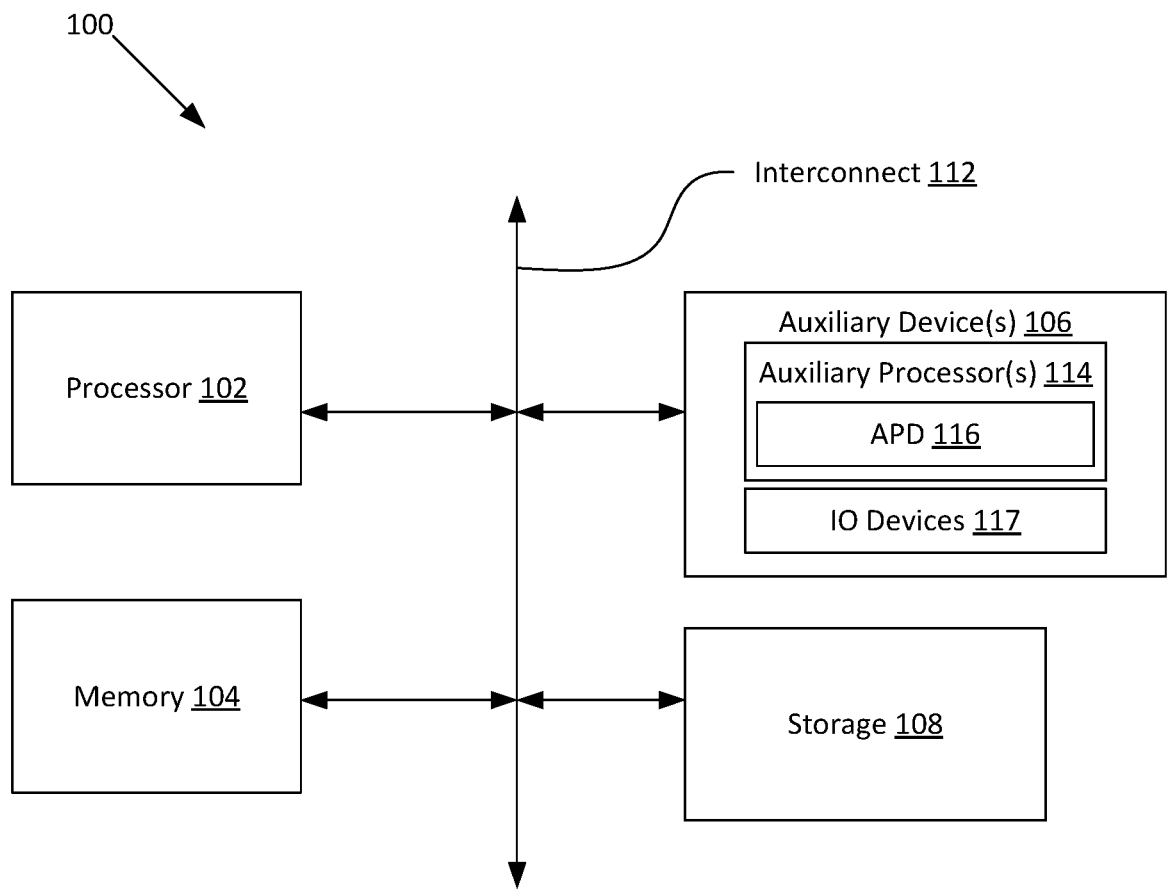
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
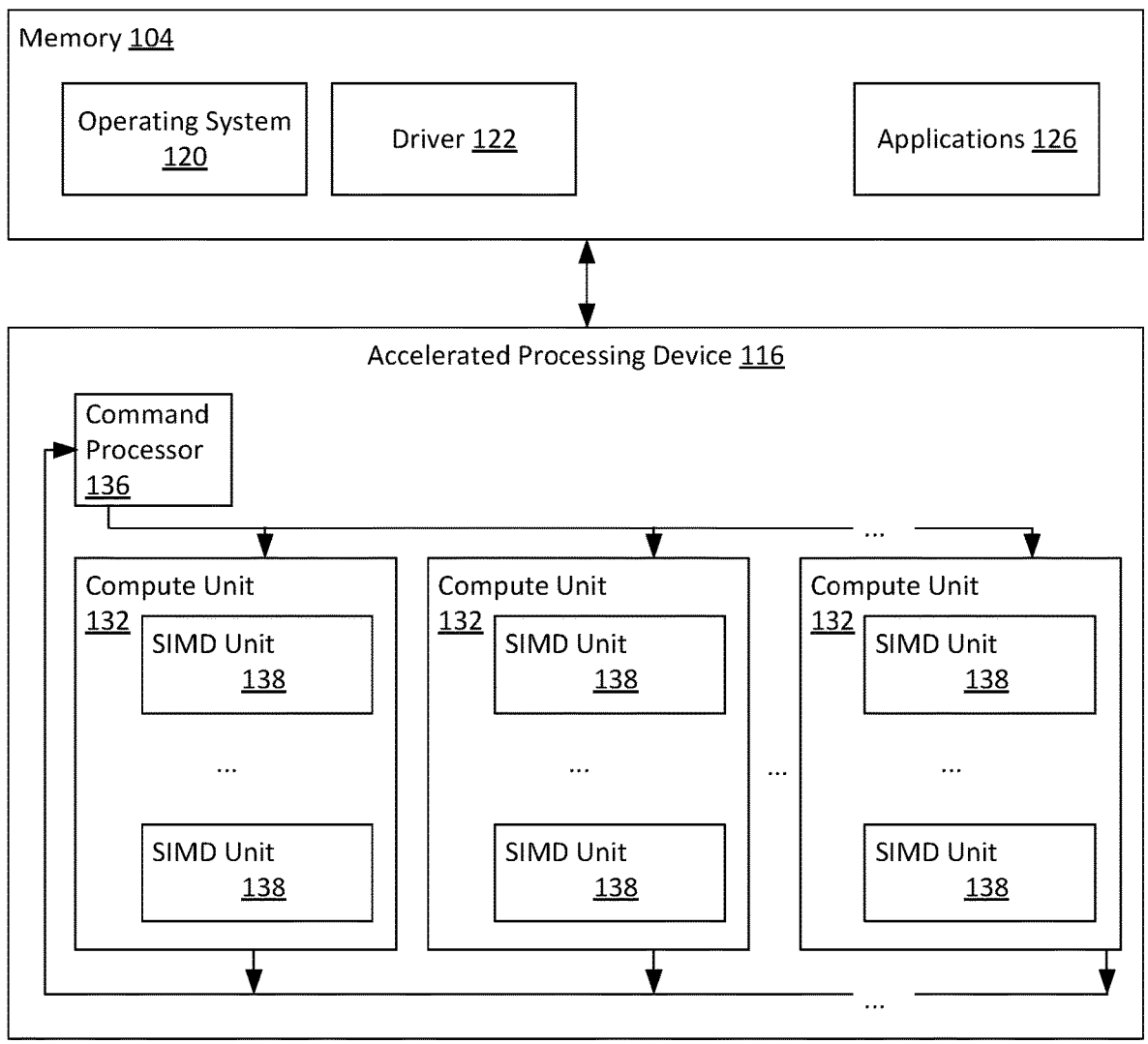
FIG. 2 illustrates details of the device of FIG. 1 and an accelerated processing device, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. A command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
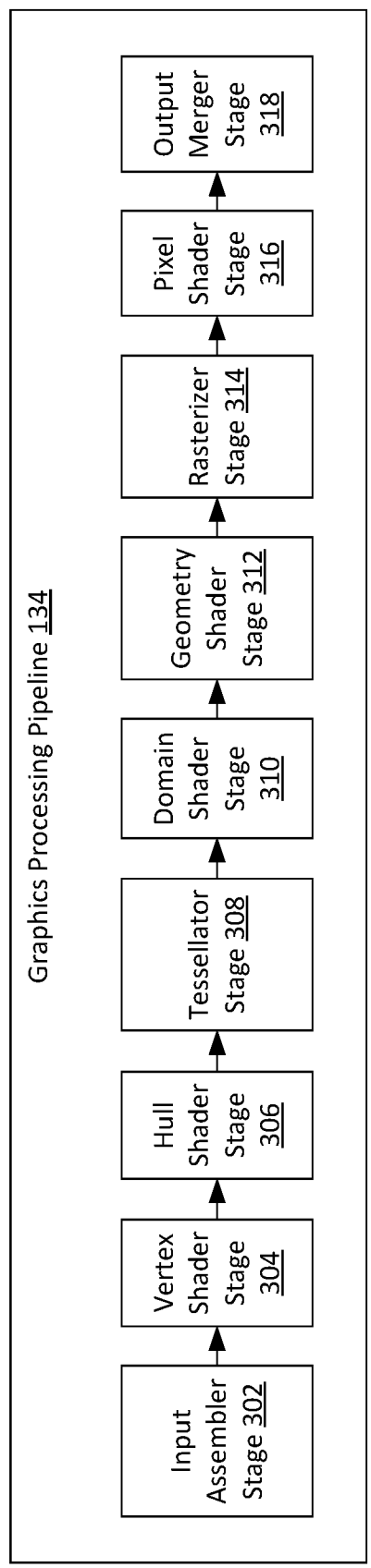
FIG. 3 is a block diagram showing additional details of the graphics processing pipeline illustrated in FIG. 2.

FIG. 3 is a block diagram showing additional details of the graphics processing pipeline 134 illustrated in FIG. 3. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

It is possible to perform rendering in a "decoupled" manner. Decoupled rendering involves decoupling sample shading operations from other operations in the pipeline such as geometry processing and actual application of the shading results to the objects of a three-dimensional scene. In "typical" rendering such as forward rendering, a rendering pipeline processes triangles, transforming the vertices of such triangles from world space to screen space, then rasterizes the triangles, generating fragments for shading by the pixel shader. The pixel shader shades such fragments and outputs visible fragments to the pixel buffer for final output. As can be seen, in such rendering operations, the rate at which pixel shading operations occur is directly related to the rate at which the other operations of the pipeline (e.g., vertex shading operations) occur. Advantage can be gained by decoupling the rate at which shading operations occur from the rate at which other operations (e.g., geometry operations) occur. Specifically, it can be possible to reduce the heavy workload of complex pixel shading operations while still generating frames at a high frame rate to reflect changes in geometry (e.g., camera position, rotation and scene geometry movement, rotation, and scaling) quickly over time.

Figure 4:
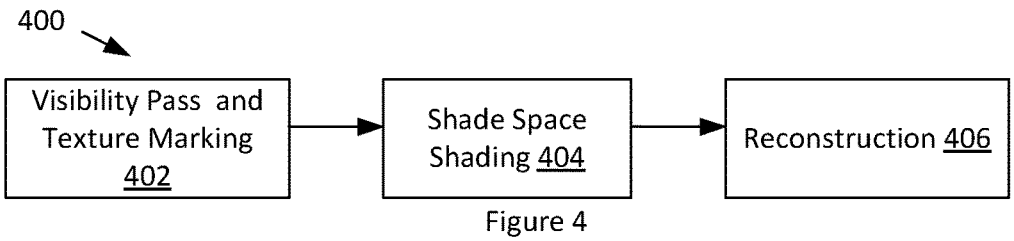
FIG. 4 illustrates a set of decoupled shading operations, according to an example.

FIG. 4 illustrates a set of decoupled shading operations 400, according to an example. The set of decoupled shading operations 400 includes a visibility pass and shade space marking operation 402, a shade space shading operation 404, and a reconstruction operation 406. In some examples, any of these operations is performed by one or more of software executing on a processor (such as the compute units 132), hardware (e.g., hard-wired circuitry), or a combination of software and hardware. In various examples, any of this software includes software executing on the processor 102 (e.g., an application), software executing in the APD 116 (e.g., shader programs), any other software, or any combination thereof. In various examples, the hardware includes any of the processors illustrated (e.g., processor 102, APD 116), or other circuitry or processors not illustrated. In this disclosure, phrases such as "the APD 116 performs a task" is sometimes used. This should be understood as meaning that any technically feasible element (e.g., the software or hardware) performs such task. In addition, although various operations are described as being performed by the APD 116, in other examples, such operations are performed by other elements such as the processor 102 or another hardware or software element not described. Herein, where it is stated that software performs an operation, this should be understood as meaning that software executing on a processor performs the operation and thus that the processor performs that operation.

As a whole, the operations of FIG. 4 involve two "phases": a shade space texture shading phase and a reconstruction phase. The shade space texture shading phase includes shading onto shade space texture for a scene. The shade space textures can be thought of as "canvases" to which shading operations are applied. The canvases are applied to the objects of a scene in the reconstruction phase. It is possible to decouple the rate at which the shade space shading phase occurs from the rate at which the reconstruction phase occurs, providing benefits such as reduce shading operation workload while still allowing for generating output frames at a high rate.

As described above, the objects of a scene each have one or more shade space textures. The shade space textures are mapped to the surfaces of such objects and colors in the shade space textures are applied to the objects during reconstruction 406. Utilizing the shade space textures in this manner allows for shading operations (e.g., the shade space shading operations 404) to occur in a "decoupled" manner as compared with the other rendering operations.

The visibility pass and shade space marking 402 involves marking which portions of the shade space textures are visible in a scene. In some examples, the scene is defined by a camera and objects within the scene, as well as parameters for the objects. In some examples, a portion of a shade space texture is visible in the event that that portion appears in the final scene. In some examples, the portion appears in the final scene if the portion is within the camera view, faces the camera, and is not occluded by other geometry. In some examples, the visibility pass and shade space marking operation 402 results in generating groups of samples, such as tiles, that are to be shaded in the shade space shading operation 404. Each tile is a set of texture samples of a shade space texture that is rendered into in the shade space shading operation 404 and then applied to the geometry in the reconstruction 406 operation. In some examples, each such tile is a fixed size (e.g., 8×8 texture samples or "texels").

The shade space shading operation 404 includes shading the visible portions of the shade space textures. In some examples, these shading operations are operations that are typically applied in the pixel shader stage 316 in "typical" rendering. Such operations include texture sampling (including filtering), applying lighting, and applying any other operations that would be performed in the pixel shader stage 316.

The reconstruction operation 406 includes applying the shade space textures to the geometry of the scene to result in a final image. In some examples, the reconstruction operation 406 processes the scene geometry through the world space pipeline, including applying the operations of the vertex shader stage 304 (e.g., vertex transforms from world-space to screen space) and the rasterizer stage 314 to generate fragments. The reconstruction operation 406 then includes applying the shade space texture to the fragments, e.g., via the pixel shader stage 316, to produce a final scene which is output via the output merger stage 318. Note that the operations of the pixel shader stage 316 in reconstruction 406 are generally much simpler and less computationally intensive than the shading operations that occur in the shade space shading operations 404. For example, while the shade space shading operations 404 perform lighting, complex texture filtering, and other operations, the reconstruction operation 406 is able to avoid many such complex pixel shading operations. In one example, the reconstruction operation 406 performs texture sampling with relatively simple filtering and omits lighting and other complex operations.

As stated above, it is possible to apply the shade space shading operation 404 at a different frequency than the reconstruction operation 406. In other words, it is possible to use the information generated by the shade space operation 404 in multiple successive reconstruction operations 406 (or reconstruction "frames"). Thus, it is possible to reduce the computational workload of the complex shading operations 404 while still generating output frames relatively quickly. The decoupled shading operations 400 will now be described in greater detail.

Figure 5:
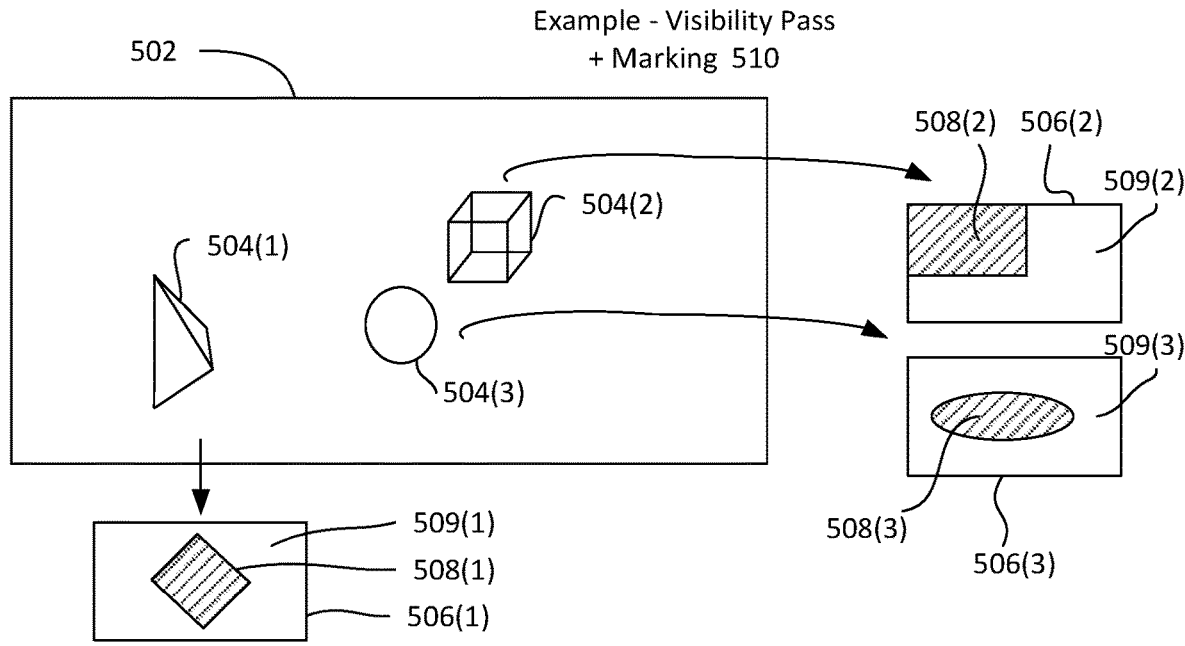
FIG. 5 illustrates operations for the visibility pass and texture marking operations, according to an example.
Figure 5:
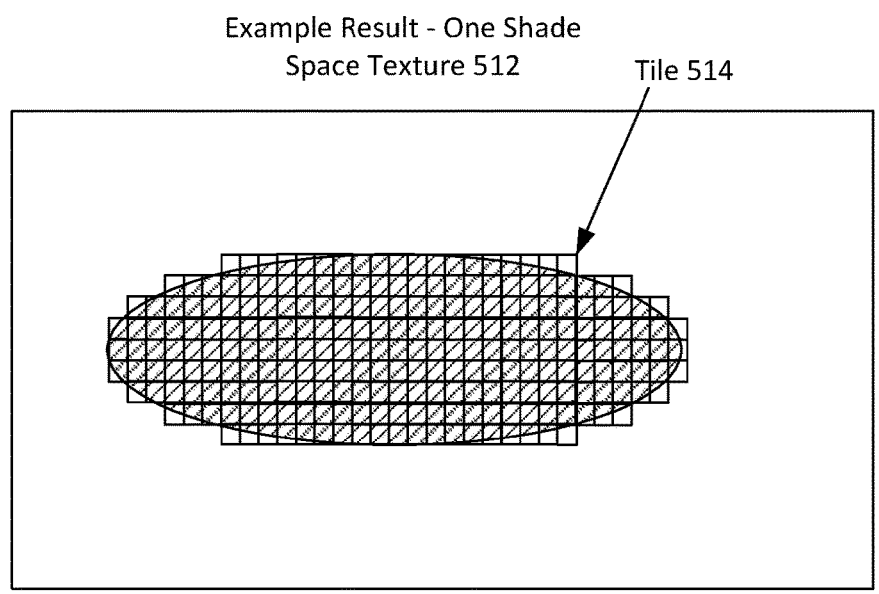

FIG. 5 illustrates operations for the visibility pass and texture marking operations 402, according to an example. Herein, the term "visibility pass 402" is used interchangeably with "visibility pass and texture marking operations 402." The example visibility pass 402 is performed for a scene 502 which includes a number of objects 504. In addition, each object 504 has an associated shade space texture 506 which has a visible portion 508 and a non-visible portion 509. As can be seen, the example visibility pass 510 results in the designation of the visible portion 508 of the associated shade space texture 506.

In an example 512, the visibility pass 402 designates the visible portions 508 of the shade space textures 506 by generating tiles 514 that cover the visible portions in the following manner. The visibility pass 402 performs the operations of the graphics processing pipeline 134 in a simplified mode. Specifically, the visibility pass 402 generates tiles for the portions of the shade space texture 506 that are visible in the scene. Each tile 514 represents a portion of the shade space texture 506 that is to be shaded in the shade space shading operation 404. Tiles that are not generated are not shaded in the shade space operation 404.

In some examples, the visibility pass 402 generates tiles by using the graphics processing pipeline 134. More specifically, the geometry of the scene 502 is processed through the graphics processing pipeline 134. Information associating each fragment with a shade space texture flows through the graphics processing pipeline 134. When the final image is generated, this information is used to identify which portions of which shade space textures 506 are actually visible. More specifically, because only visible fragments exist in the final output image, the information associated with such fragments is used to determine which portions of the shade space textures 506 are visible.

Figure 6:
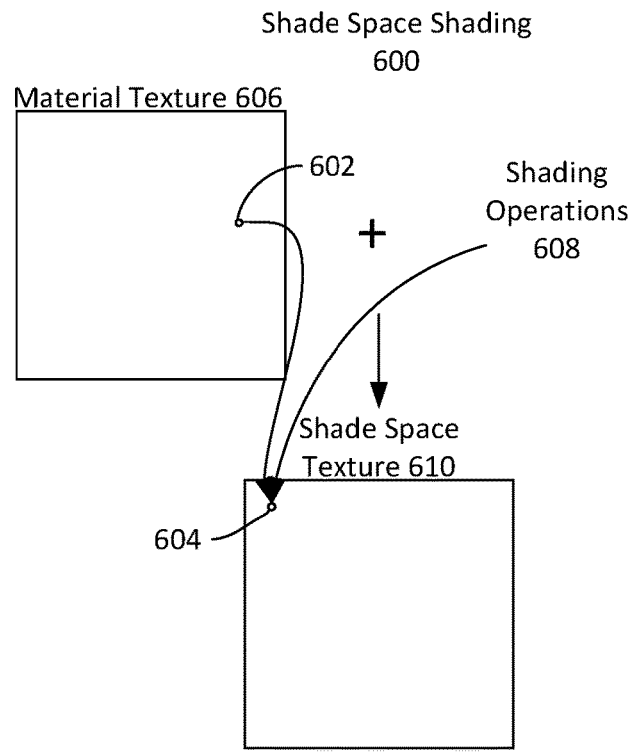
FIG. 6 illustrates example shade space shading operations for the shade space shading operations of FIG. 4.
Figure 7:
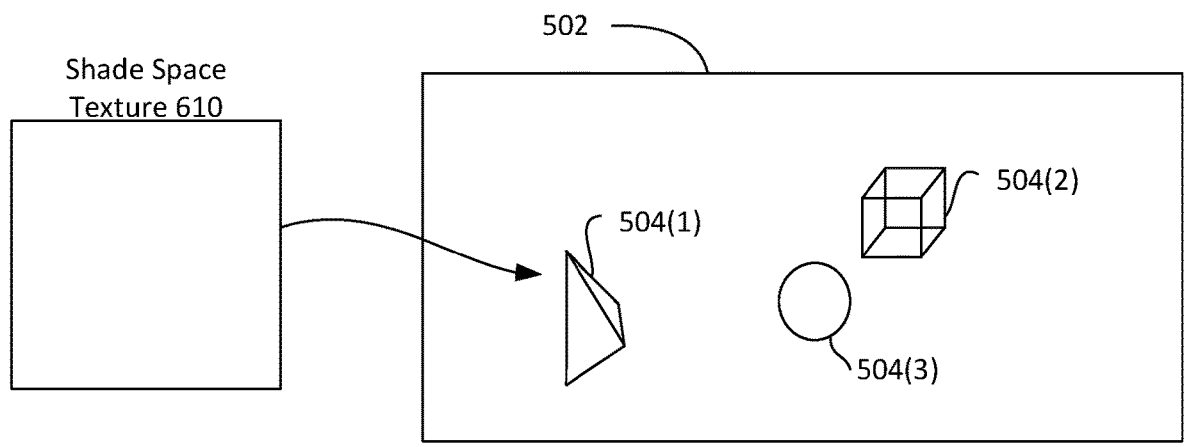
FIG. 7 illustrates an example reconstruction operation.

FIG. 6 illustrates example shade space shading operations 600 for the shade space shading operations 404 of FIG. 4. The APD 116 performs shade space shading 600 by sampling a material texture 606 within a sample area 602 to obtain a texture color and applying shading operations 608 (e.g., lighting and/or other operations) as a result to generate a shade space color sample 604 for the shade space texture 610. In some examples, the shade space shading operations 600 generates texels for the entirety of each of the tiles 514 that are generated as a result of the visibility pass 402. FIG. 7 illustrates an example reconstruction operation 700. In the reconstruction operation 700, the shade space texture 610 is applied to the objects 504 within the scene. As stated elsewhere herein, in some examples, this application is performed via relatively simple texture sampling operations that sample the shade space texture 610 in a relatively simple manner and apply such samples to the objects 504 of the scene 502.

As stated above, much of the "heavy lifting" for pixel shading is done in the shade space shading phase as opposed to the reconstruction phase. In some examples, the pixel shading operations of the shade space shading operation 404 includes performing anisotropic filtering. Anisotropic filtering is a form of texture sampling that attempts to match the pixel frequency of the output image (e.g., the image that is the result of the reconstruction operation) to the resolution of the filtered texture samples. Without anisotropic filtering, texture samples are obtained using an isotropic filter, which weights texel values obtained for an area around a sample position where the area has a similar size in both horizontal and vertical dimensions. For example, a bilinear filter obtains a texture sample as a value that is calculated from the weighted average of texel values in a 2×2 area around the sample location. Note, the sample location is the location within a texture for which sampling is desired. Sample locations correlate pixel positions to positions within textures using texture coordinates (e.g., u,v coordinates) which are interpolated for each pixel based on the texture coordinates of the vertices of a triangle. Note that in the above, there is a particular rate of change for the texture coordinates as compared with the screen pixel coordinates. In other words, it may be the case that there are 1.2 texels for every screen pixel. In this situation, this comparative rate of change of texel coordinates relative to pixels is referred to as the gradients.

With anisotropic filtering, it is assumed that there is a possibility for the horizontal texture gradients (e.g., the rate at which the horizontal texture coordinate changes as compared to the rate at which the screen pixel coordinates change) to be different than the vertical texture gradients. This can be the case where, for example, a surface to be textured is angled with respect to the camera view. Anisotropic filtering accounts for this possibility by adjusting the texture sample filter area to have different dimensions in the horizontal and vertical direction.

Figure 8:
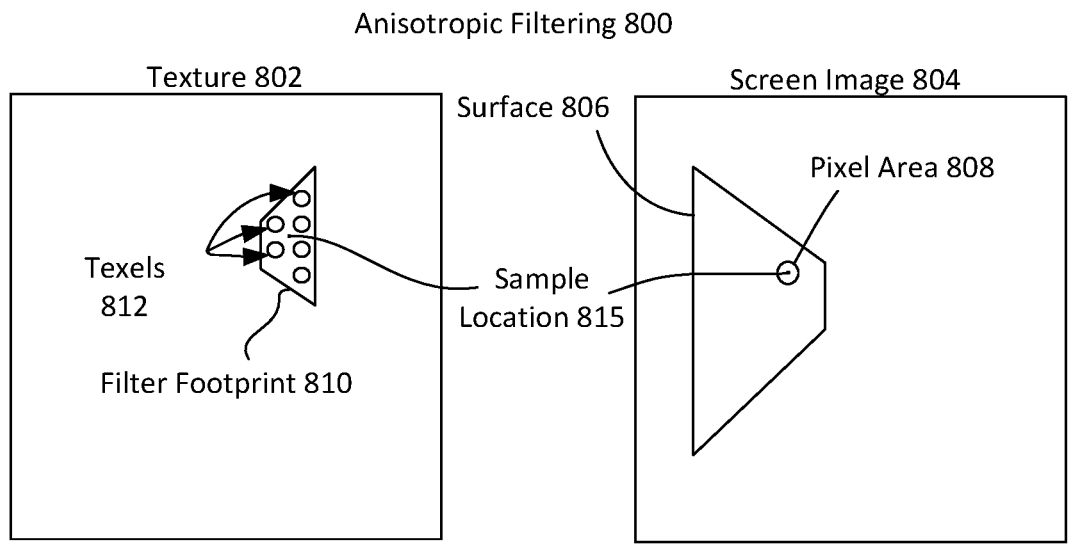
FIG. 8 illustrates operations for anisotropic filtering, according to an example.

FIG. 8 illustrates operations for anisotropic filtering 800, according to an example. In the example, the goal for an anisotropic filtering operation is to generate a texture sample for a pixel in the output screen image. In FIG. 8, the output screen image 804 is illustrated and the source texture 802 is also illustrated. Due to the angle of the surface 806 with respect to the screen image 804, the area corresponding the screen pixel 808 does not have the same shape as in the texture 802. Stated differently, the rate of change of the screen pixels as compared with that of the texels is different in the horizontal and vertical directions. Again, these rates of change are expressed as gradients. To perform anisotropic filtering, a texture unit determines a filter footprint 810 based on these gradients (which are reflective of how the pixel area 808 projects onto the texture 802), and filters together the texels 812 of the filter footprint 810. In some examples, this filtering weights the texels 812 within the filter footprint based on distance to the sample location 815 (which is shown at corresponding locations in the texture 802 and the screen image 804). As can be seen, the anisotropic filtering generates a texture sample by filtering together texel values from a filter footprint that corresponds to a pixel in screen space. Because the filtering is anisotropic, the filter footprint does not necessarily have a shape with equal extents in all directions. For example, it is possible for the filter footprint to be elongated in some direction.

There is difficulty in performing anisotropic filtering with decoupled rendering. Specifically, as described above, decoupled rendering involves first performing shade space rendering and then performing reconstruction. Shade space rendering involves applying samples from a material texture to a shade space texture and reconstruction involves applying the shade space texture to the objects of the scene. Note that the material texture is distinct from the shade space texture, which is generated for the purpose of decoupled rendering. In some examples, material textures are generated by graphics artists and stored as data with an application, although material textures can also be generated or modified at runtime (e.g., via render to texture). The shade space textures, on the other hand, are generated at runtime as part of the decoupled rendering technique. The shade space textures incorporate information from material textures, but also include additional information such as lighting and other information.

As stated, anisotropic filtering for decoupled rendering provides some difficulties. For example, although it is desirable to perform much of the "heavy lifting" of shading in the shade space shading operation 404, the shade space shading operation 404 does not, by default, have information that correlates shade space pixel spacing to material texture texel spacing and thus could not perform such anisotropic filtering without such information. It could be possible to perform anisotropic filtering in the reconstruction operation 406, using the shade space textures. However, again, it is a goal of decoupled rendering to perform much of the "heavy lifting" for shading in the shade space shading operation 404, rather than the reconstruction operation 406. Performing such anisotropic filtering in the reconstruction operation 406 would be counter to this goal, as such filtering is expensive in terms of the computational intensity of the filtering operations themselves in addition to the number of samples that need to be fetched to perform such filtering operations.

For at least these reasons, techniques are provided herein to perform anisotropic filtering for decoupled rendering by performing the anisotropic filter sampling in the shade space shading operation 404 on material textures, and by performing much less computationally expensive non-anisotropic filtering in the reconstruction operation 406, which reduces the shading cost as compared with performing anisotropic filtering in the reconstruction operation 406. The techniques include operations for obtaining the gradients for material texture to shade space texture and for shade space texture to screen space so that the anisotropic filtering can be performed in the shade space shading operation 404. In general, the techniques involve identifying the shade space texture to screen space gradients in the visibility pass 402 and passing this information to the shade space shading operation 404. The shade space shading operation 404 combines this information with the gradient information for the material texture gradients to shade space texture to obtain gradients for the filtering operation for the material texture. These final gradients specify how the anisotropic filtering is to be performed. The shade space shading operation 404 then performs texture sampling from the material texture with anisotropic filtering using these final gradients to obtain a filtered material sample that is applied to the shade space texture. Subsequently, in the reconstruction operation 406, the APD 116 applies this pre-filtered sample to the geometry of the scene. In essence, the anisotropy is "baked into" the shade space texture during the shade space shading operation 404, which eliminates the need to perform such filtering in the reconstruction operation 406.

To reduce the amount of gradient information needed to be transmitted from the visibility pass 402 to the shade space shading operation 404, the visibility pass 402 generates a single set of gradients for one sample for a group of shade samples such as a tile, and passes that information to the shade space shading operation 404, rather than one set of gradients per shade space texture texel. In addition, the visibility pass 402 selects the sample in a sample group for which such gradient information is determined in a "stable" fashion, attempting to select the same sample for different visibility pass 402 "frames," to prevent visual artifacts associated with varying gradients over time from occurring. Additional details follow.

Figure 9:
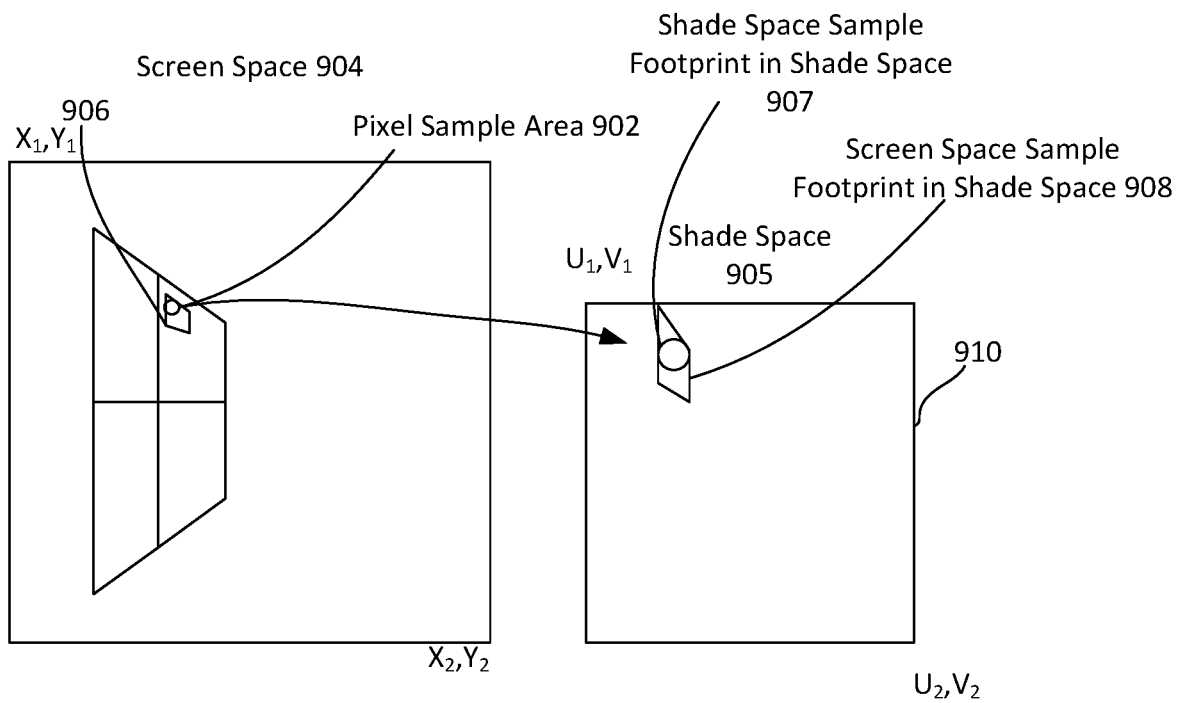
FIG. 9 illustrates the screen space to shade space gradients for anisotropic filtering, according to an example.

FIG. 9 illustrates the shade space coordinate gradients in a screen space for anisotropic filtering, according to an example. In FIG. 9, a single sample area 902 in screen space 904 is shown. This sample area 902 is within a tile area 906 of the shade space. Note that the tile area 906 is not shown to scale in FIG. 9. For example, while there may be 8×8=64 samples in a tile, FIG. 9 does not illustrate the sample area 902 in a way that would allow 64 samples to fit. The tile area 906 is a tile in the shade space and is thus not necessarily rectangular in the screen space 904. With the geometry illustrated, the tile is non-rectangular in screen space.

As can be seen, the pixel sample area 902 occupies a particular area in the shade space—the screen space sample footprint in shade space 908. The shade space coordinate gradients in the screen space represent information that transforms the pixel sample area 902 in screen space 904 to the screen space sample footprint in shade space 908. More specifically, these gradients represent the rate of change of the texels in the screen space 905 to the rate of change of the screen space samples.

Note that within a tile 910 (which corresponds to the tile 906), it is possible for the shade space gradients to vary across the tile. However, for the operations described herein, only one set of such gradients, for one sample, is stored, per tile. This set of gradients can be thought of as representative for the entire tile 910, even though the values of such gradients are not necessarily completely accurate throughout the tile.

A shade space sample footprint in the shade space 907 is shown. This sample footprint 907 is illustrated to contrast with the screen space sample footprint in shade space 908. More specifically, the shade space sample footprint 907 is just the footprint of a single texel in the shade space 905 and thus does not have any of the distortion that appears for the screen space sample in shade space 905. Note that although the shade space sample footprint 907 is shown in the center of the screen space sample footprint 908, there does not need to be any such correlation in the shade space 905 as the pixels can fall on any portion of the shade space texture 905. Note also that the texture coordinate minima $U_1$, $V_1$ and maxima $U_2$, $V_2$ are illustrated. The shade space to screen space gradients describe the rate of change of these UV coordinates with respect to the XY coordinates of the screen space 904, which are also shown in FIG. 9.

Figure 10:
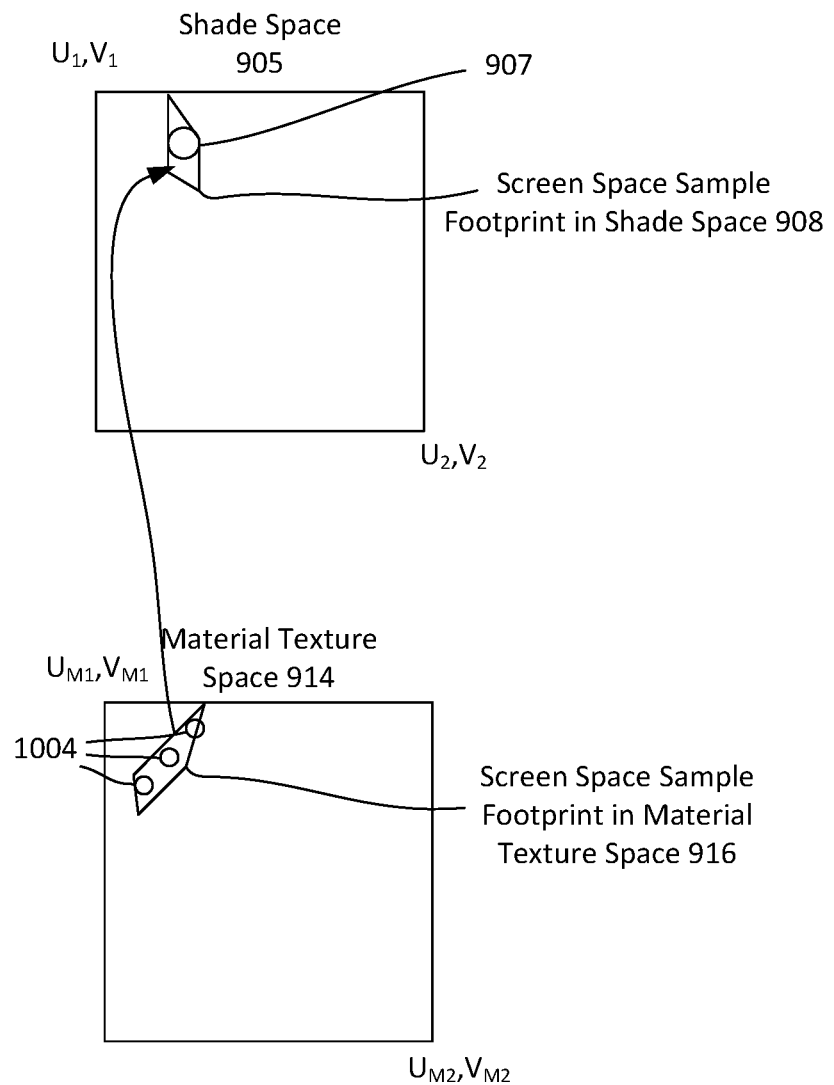
FIG. 10 illustrates shade space shading, including operations related to anisotropic filtering and the shade space to material texture space gradients, according to an example.

FIG. 10 illustrates shade space shading, including operations related to anisotropic filtering and the shade space 905 to material texture space 914 filter footprints defined by texture coordinate gradients, according to an example. In the shade space 905, the shade space texel area 907 is illustrated and the screen space sample footprint in shade space 908 is illustrated as well. The material space texture 914 has texture coordinates $U_M$, $V_M$, and the minima and maxima for the portion of the material texture space 914 are shown as $U_{M1}$, $V_{M1}$ and $U_{M2}$, $V_{M2}$, respectively. The material texture coordinate gradients in shade space defines the rate of change of $U_M$, $V_M$ to U, V (that is, between the material texture space 914 and the shade space 905). Together, the gradients illustrated in FIG. 10 between the material texture space 914 and the shade space 905 and the gradients illustrated in FIG. 9 between the shade space 905 and the screen space 904 describe relationship between the rate of change of the material texture coordinates relative to screen pixels. Material texture space samples 1004 corresponding to the screen space sample footprint 916 are shown.

As described above, the visibility pass 402 includes determining the gradients that describe the rate of change of the shade space texels with respect to the screen space pixels. More specifically, again, in the visibility pass 402, the scene is processed using the shade space textures to determine what portions of those shade space textures are visible. This processing also generates the above gradients, since the rasterization stage generates fragments, each of which has U, V coordinates corresponding to the shade space texture. These rasterization operations also provide the gradients of the shade space U, V coordinates with respect to the screen space coordinates.

The shade space shading operation 404 includes obtaining the gradients of the material texture coordinates with respect to the shade space coordinates. The shade space shading operation 404 also includes combining these gradients with the gradients obtained in the visibility pass 402 to obtain a composite gradient that describes the rate of change of the material texture coordinates with respect to the screen space coordinates, as if the material texture was directly sampled while rendering into the screen space (also referred to as "forward rendering"). The shade space shading operation 404 then involves sampling the material texture anisotropically based on these combined gradients. As stated elsewhere herein, this anisotropic sampling utilizes the gradients to filter together multiple samples of the material texture in a way that is representative of the screen space sample footprint in the material texture space 916 in order to obtain a sample value. This sample value is the material texture sample that is used (along with, potentially, other operations such as lighting) to color the texels 907 of the shade space texture 905. It can be seen that the gradient that is formed from information of the visibility pass 402 and the shade space shading operation 404 is used to perform anisotropic filtering on the material texture and apply that information to the shade space texture. In reconstruction, that information is then applied to the scene.

As stated above, in the visibility pass 402, the APD 116 obtains a set of gradients for a single sample 907 of a tile 910 in shade space. In other words, to generate a set of gradients for a single tile 910, the APD 116 selects a sample from within a tile for which to calculate the gradients for. In some examples, the APD 116 selects the same sample—the "representative sample"—(i.e., the same sample location, such as the sample that is 3 from the left and 3 from the top in an 8×8 tile), unless that sample location is not visible. In some implementations, for tiles where the representative sample is not visible, the APD 116 selects the visible sample that is closest to the representative sample and calculates the gradient for the tile based on that sample. Performing these operations helps to "stabilize" the gradient for a tile to prevent temporal visual artifacts (e.g., flickering) over successive frames.

Figure 11:
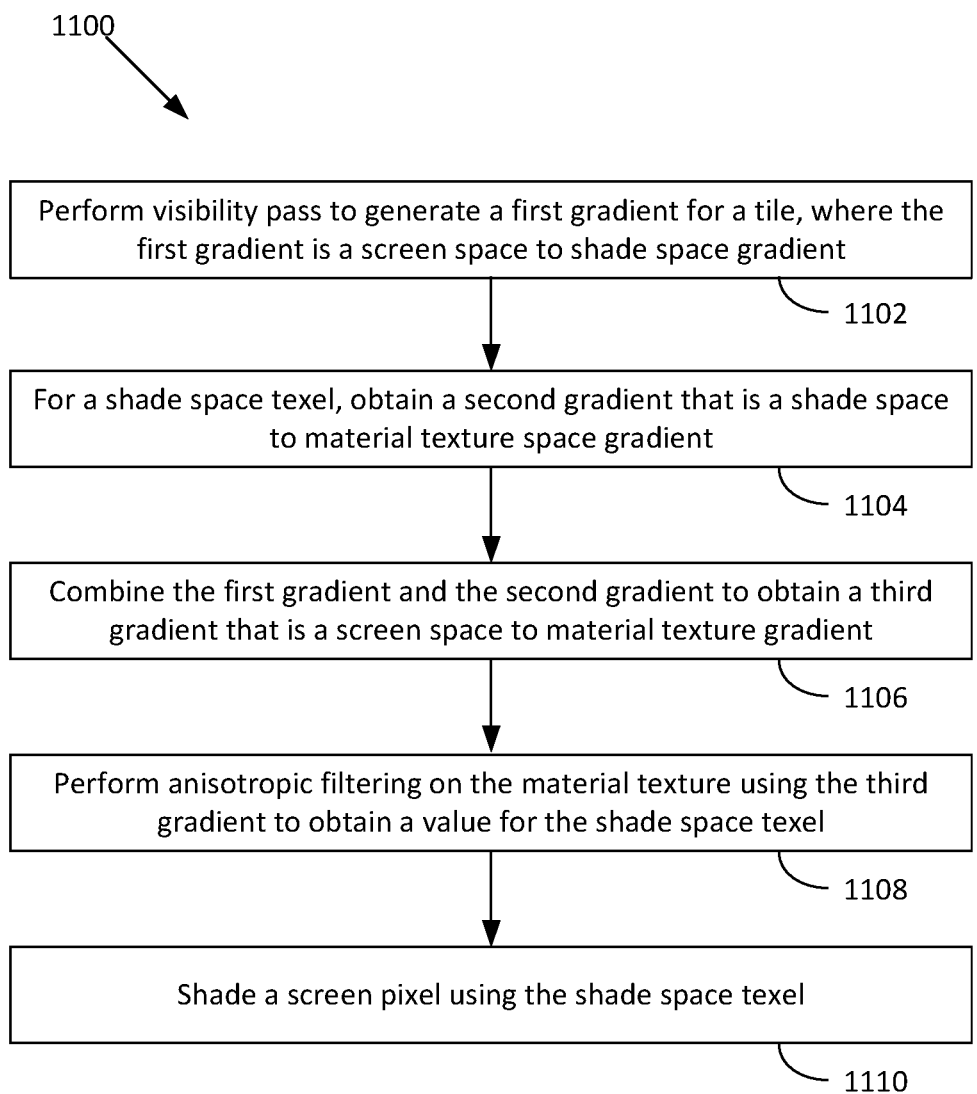
FIG. 11 is a flow diagram of a method for performing decoupled shading, according to an example.

FIG. 11 is a flow diagram of a method 1100 for performing decoupled shading, according to an example. Although described with respect to the system of FIGS. 1-10, those of skill in the art will recognize that any system, configured to perform the steps of the method 1100 in any technically feasible order, falls within the scope of the present disclosure.

At step 1102, the APD 116 performs a visibility pass 402. Among other things, the visibility pass 402 generates a first gradient for a tile. The first gradient is a shade space gradient in screen space. More specifically, the first gradient describes the relationship between the distance between texels in the shade space texture and the distance between pixels on the screen (or other output image). In some examples, step 1102 is performed in the visibility pass 402 as described elsewhere herein.

At step 1104, the APD 116 obtains a second gradient for a shade space texel. The second gradient is a gradient that describes the rate of change of the material texture coordinates relative to the shade space samples. In some examples, this step is performed in the shade space shading pass, since in this pass, one task is to shade the shade space textures and thus information for both the shade space textures and the material textures is available.

At step 1106, the APD 116 combines the first gradient and the second gradient to obtain a third gradient. The third gradient is a material texture gradient in screen space that describes the relationship between the distance between the material texture texels and the distance between the screen space pixels. In some examples, this combination is performed by performing a transformation with a Jacobian matrix that describes the surface local coordinate transformation in shade space. In some examples, step 1106 is performed for each visible texel of the shade space texture. In these examples, the first gradient is the same for each texel within one tile and the second gradient is potentially different for each texel within a tile.

At step 1108, the APD 116 performs anisotropic filtering on the material texture using the third gradient to obtain a value for the shade space texel. More specifically, the third gradient describes the relationship between the distance between material texture texels and the distance between screen space pixels. This is the value that is used to perform anisotropic filtering, since this value is directly related to the shape of the screen space pixel footprint in the material texture as described elsewhere herein. The filtered material texture value is used to shade a shade space texel, along with other pixel shader information such as lighting or other information that could be used in the pixel shader stage.

At step 1110, the APD 116 shades a screen pixel using the shade space texel. In some examples, this operation occurs in the reconstruction 406 operation. In some examples, a much simpler filter is used in step 1110 than anisotropic filtering. In an example, a bilinear filter is applied in step 1110. In other examples, a different type of isotropic filter is used.

Note that the reconstruction operation 406, which includes step 1110, is, in various examples, performed at a much higher rate than the shade space shading operation 404. The reconstruction operation 406 is able to use the texels of the shade space shading operation 404 multiple times after such texels are generated, and can thus make use of the gradient information described with respect to FIG. 11.

It should be understood that many variations are possible based on the disclosure herein. Although features and elements are described above in particular combinations, each feature or element can be used alone without the other features and elements or in various combinations with or without other features and elements.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, the storage 108, the command processor 136, compute units 132, SIMD units 138, input assembler stage 302, vertex shader stage 304, hull shader stage 306, tessellator stage 308, domain shader stage 310, geometry shader stage 312, rasterizer stage 314, pixel shader stage 316, or output merger stage 318 are implemented fully in hardware, fully in software executing on processing units, or as a combination thereof. In various examples, such "hardware" includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering, the method comprising:
generating, by a processor, a first gradient for a shade space texture tile, wherein the first gradient reflects a relationship between shade space texel spacing and screen space pixel spacing;
generating, by the processor, a second gradient for a shade space texel of the shade space texture tile, wherein the second gradient reflects a relationship between material texel spacing for a material texture and shade space texel spacing;
combining, by the processor, the first gradient and the second gradient to obtain a third gradient; and
performing, by the processor, anisotropic filtering on the material texture using the third gradient to obtain a value for the shade space texel.

2. The method of claim 1, wherein the third gradient reflects a relationship between material texel spacing and screen space pixel spacing.

3. The method of claim 1, wherein generating the first gradient occurs in a visibility pass.

4. The method of claim 1, wherein generating the second gradient occurs in a shade space shading operation.

5. The method of claim 4, further comprising shading a screen pixel using the shade space texel.

6. The method of claim 5, wherein shading the screen pixel occurs in a reconstruction operation.

7. The method of claim 6, wherein:
the reconstruction operation is part of a sequence of reconstruction frames;
the shade space shading operation is part of a sequence of shade space shading frames; and
the sequence of reconstruction frames is processed at a higher frequency than the sequence of shade space shading frames.

8. The method of claim 1, wherein the first gradient is representative of the shade space texture tile.

9. The method of claim 8, wherein the first gradient is for a sample of the shade space texture tile that is a closest visible sample to a fixed sample position of the shade space texture tile.

10. A system comprising:
a processor; and
a memory storing instructions that, when executed by the processor, cause the processor to perform operations including
generating a first gradient for a shade space texture tile, wherein the first gradient reflects a relationship between shade space texel spacing and screen space pixel spacing;
generating a second gradient for a shade space texel of the shade space texture tile, wherein the second gradient reflects a relationship between material texel spacing for a material texture and shade space texel spacing;
combining the first gradient and the second gradient to obtain a third gradient; and
performing anisotropic filtering on the material texture using the third gradient to obtain a value for the shade space texel.

11. The system of claim 10, wherein the third gradient reflects a relationship between material texel spacing and screen space pixel spacing.

12. The system of claim 10, wherein generating the first gradient occurs in a visibility pass.

13. The system of claim 10, wherein generating the second gradient occurs in a shade space shading operation.

14. The system of claim 13, wherein the instructions further cause the processor to shade a screen pixel using the shade space texel.

15. The system of claim 14, wherein shading the screen pixel occurs in a reconstruction operation.

16. The system of claim 15, wherein:
- the reconstruction operation is part of a sequence of reconstruction frames;
- the shade space shading operation is part of a sequence of shade space shading frames; and
- the sequence of reconstruction frames is processed at a higher frequency than the sequence of shade space shading frames.

17. The system of claim 10, wherein the first gradient is representative of the shade space texture tile.

18. The system of claim 17, wherein the first gradient is for a sample of the shade space texture tile that is a closest visible sample to a fixed sample position of the shade space texture tile.

19. A non-transitory computer-readable storage medium storing instructions that, when executed by a processor, cause the processor to perform operations comprising:
- generating a first gradient for a shade space texture tile, wherein the first gradient reflects a relationship between shade space texel spacing and screen space pixel spacing;
- generating a second gradient for a shade space texel of the shade space texture tile, wherein the second gradient reflects a relationship between material texel spacing for a material texture and shade space texel spacing;
- combining the first gradient and the second gradient to obtain a third gradient; and
- performing anisotropic filtering on the material texture using the third gradient to obtain a value for the shade space texel.

20. The non-transitory computer-readable storage medium of claim 19, wherein the third gradient reflects a relationship between material texel spacing and screen space pixel spacing.

\* \* \* \* \*